US00RE38394E

(19) United States
(12) Reissued Patent
Morse et al.

(10) Patent Number: US RE38,394 E
(45) Date of Reissued Patent: Jan. 27, 2004

(54) BASEBALL CAP WITH DISTORTED GRAPHICS

(75) Inventors: Richard J. Morse, Barrington, RI (US); Kevin Raming, Attleboro, MA (US)

(73) Assignee: Morse Engineering, Barrington, RI (US)

(21) Appl. No.: 09/861,376

(22) Filed: May 18, 2001

Related U.S. Patent Documents

Reissue of:
(64) Patent No.: 5,903,923
Issued: May 18, 1999
Appl. No.: 09/093,262
Filed: Jun. 8, 1998

(51) Int. Cl.[7] ..... A42B 1/24
(52) U.S. Cl. ..... 2/195.1; 2/244; 40/329; 40/427
(58) Field of Search ..... 2/195.1, 244, 246, 2/10, 12; 40/329, 427, 586; 472/57; 359/234, 236

(56) References Cited

U.S. PATENT DOCUMENTS 3,631,619 A * 1/1972 Campbell ..... 40/564
4,873,726 A * 10/1989 Tapia ..... 2/195.1
5,253,368 A * 10/1993 Blake ..... 2/209.13
5,410,761 A * 5/1995 Connelly et al. ..... 2/195.1
5,556,135 A * 9/1996 Duncan ..... 283/48.1
5,701,607 A * 12/1997 Kaiser ..... 2/209.13
5,983,400 A * 11/1999 Kronenberger ..... 2/209.13

* cited by examiner

*Primary Examiner*—John J. Calvert
*Assistant Examiner*—Katherine Moran
(74) *Attorney, Agent, or Firm*—Salter & Michaelson

(57) ABSTRACT

A baseball cap having distorted graphics applied to the upwardly facing surface of the cap's visor, wherein the graphics are distorted in such a manner as to compensate for perspective and become more easily readable when viewed from a particular viewing position, more particularly, a frontal viewing position. The graphics may be text or pictorial views, and are distorted in such a manner that the distortion compensate[s] for the distortion that normally exists when the visor is viewed from the frontal position whereby the graphics are easier to read or understand when so viewed.

14 Claims, 6 Drawing Sheets

BASEBALL CAP WITH DISTORTED GRAPHICS

Matter enclosed in heavy brackets [ ] appears in the original patent but forms no part of this reissue specification; matter printed in italics indicates the additions made by reissue.

BACKGROUND AND SUMMARY OF INVENTION

This invention relates generally to headwear, and more particularly to headwear having a visor extending from the edge of a hat, such as a baseball cap. It is common practice to apply graphics of one kind or another to the top surface of the visor. However, when the cap is being worn, the graphics on the visor are distorted and difficult to read or understand by someone who is in "face-to-face" relation with the wearer. This is because the graphics are on a surface that is in angular relation when seen by the viewer from such a position. The basic concept of the instant invention is to compensate for this distortion by applying purposely distorted graphics to the cap visor (when viewed straight on from above the visor), the arrangement being such that when the visor is viewed by someone in "face-to-face" relation with the wearer, the distorted graphics are compensated for by the angulation of the visor, and the graphics become easily readable and/or understood. The graphics may be computer generated and may be applied to the visor by being directly printed or silk screened thereon, or by being applied to labels that are adhered to the visor. It is well known in the prior art to have varying graphics applied to different portions of a baseball cap. It should be understood that graphics is a broad term that represents both text and pictorials. The graphics may be applied to the rear portion of the cap, or the visor of the cap, but most commonly are found on the front forehead portion of the cap. The graphics traditionally represent such things as different sporting teams, musical groups, companies, resorts, islands, states, etc. Many people own at least one baseball cap, and many have a large selection of caps in order to have many to choose from. Since the cost of the traditional baseball cap is rather inexpensive, it is affordable for people to have a variety of these caps to choose from. The instant invention relates to a traditional baseball cap having distorted graphics applied to the upwardly facing surface of the visor of the cap. The distortion is such that it compensates for perspective as experienced by an observer, when that observer is essentially in a "face-to-face" relationship with the wearer of the cap. Thus, the important feature of the invention is to provide purposely distorted graphics on the visor of a baseball cap which become more easily readable when viewed in a "face-to-face" relation with a person wearing the cap. It should be understood that the graphics may be distorted in any number of ways so as to be easily readable from a number of different "face-to-face" viewing positions, but difficult to read when viewed from straight on, i.e., a ninety degree viewing position looking straight down at the visor.

The instant invention is directed to a baseball cap having distorted graphics applied to the upwardly facing surface of the cap's visor, wherein the graphics are distorted in such a manner as to compensate for perspective and become more easily readable when viewed from particular viewing positions. The baseball cap is of the traditional type having a cap portion for surrounding and covering the top of a person's head, and a visor portion extending outwardly from the bottom front edge of the cap portion for protecting the person's eyes from the sun. The visor has upwardly and downwardly facing surfaces, and distorted graphics are applied to the upwardly facing surface of the visor in such a manner that the graphics compensate for perspective from a generally "face-to-face" viewing position, thus removing the distortion, and making the graphics easy to read and/or understand. The graphics may be applied to the upwardly facing surface of the visor of the cap by printing, heat transfer, or any other suitable method. The graphics may include text or pictorial scenes and still be distorted in such a manner that they become more clearly understandable when viewed face on, such as by a person standing in front of the person wearing the cap in generally "face-to-face" relation. As set forth above, the graphics would be applied to the upwardly facing surface of a baseball cap visor. The invention includes determining the perspective angle change between a first viewing position where one looks straight down at the top of the visor and a second viewing position where one looks at the visor as seen when standing "face-to-face" with the wearer of the cap, and then distorting normally proportioned graphics appropriately such that perspective foreshortening from the second viewing position restores desired proportions enabling the graphics to become more easily readable.

Accordingly, among the several objects of the instant invention are: the provision of a baseball cap having distorted graphics applied to the upwardly facing surface of the cap's visor, which distortions are removed when one looks at the visor "face-to-face", the provision of such a baseball cap wherein the distorted graphics are computer generated; the provision of such a baseball cap wherein the distorted graphics may be applied directly to the upwardly facing surface of the cap's visor, or in the alternative, may be separately applied thereto by a sticker or printed decal means; the provision of such a baseball cap wherein the distorted graphics may be text or picture graphics; the provision of such a baseball cap having endless advertising possibilities; the provision of a baseball cap that is neat and attractive in appearance; and the provision of a baseball cap that is cost efficient and easy to manufacture.

Other objects, features, and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
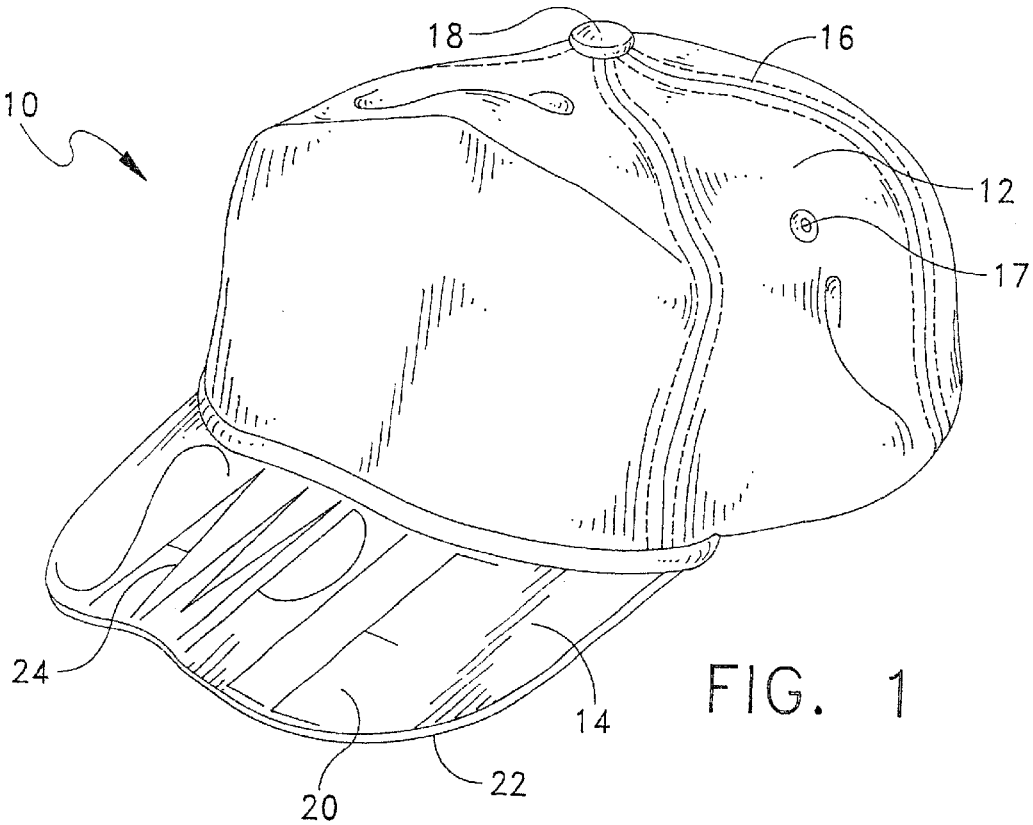
FIG. 1 is a perspective view showing a baseball cap provided with distorted text on the visor of the cap.

Referring now to the drawings, and more particularly to FIG. 1, a baseball cap having distorted text applied to the upwardly facing surface of the cap's visor is shown and generally indicated at 10. As will hereinafter be more fully described, the instant invention is directed to purposely distorted graphics applied to the upwardly facing surface of a visor. The graphics are distorted in such a manner that they compensate for perspective when observed from a frontal viewing position. The graphics become more easy to view when viewed from the frontal viewing position, but are distorted and difficult to read when the line of sight is perpendicular to the visor as shown in FIG. 2.

Referring now to FIG. 1, a baseball cap having purposely distorted graphics applied to the upwardly facing surface of the cap's visor is shown at 10. The baseball cap is of the conventional type having a cap portion indicated at 12 for covering a person's head and a visor portion indicated at 14 extending outwardly from the bottom front edge of the hat providing protection of the user's eyes from the sun. The cap portion 12 includes a generally continuous piece of flexible fabric material having a generally semi-spherical shape for covering the wearer's head. The continuous piece of flexible material includes several sections of material stitched together as at 16 to form the cap 12 of the hat 10. As shown in FIG. 2, the stitching 16 spiders outwardly from a button 18 located at the top portion of the cap 12 dividing the cap into six sections stitched together to form the cap. The cap 12 further includes several air holes 17 located therein which allow air to ventilate the wearer's head during periods of hot weather. The visor 14 includes a more rigid piece of material, preferably fabricated from cardboard or the like, and covered with a sheathing material which in most cases is the same type of material from which the cap 12 is fabricated. The visor 14 is fixedly stitched to the bottom front edge of the cap and provides a shade for blocking the sun from the wearer's eyes. The visor 14 has an upwardly facing surface 20 and a downwardly facing surface 22, and the upwardly facing surface 20 of the visor 14 is provided with distorted text 24 printed thereon. In most cases, the distorted text 24 is computer generated and is either printed directly onto the upwardly facing surface 20 of the visor 14 or printed on a transfer sheet wherein the text is heat transferred to the upwardly facing surface of the visor. As shown in the drawings, the distorted text 24 spells the word "sample".

Figure 2:
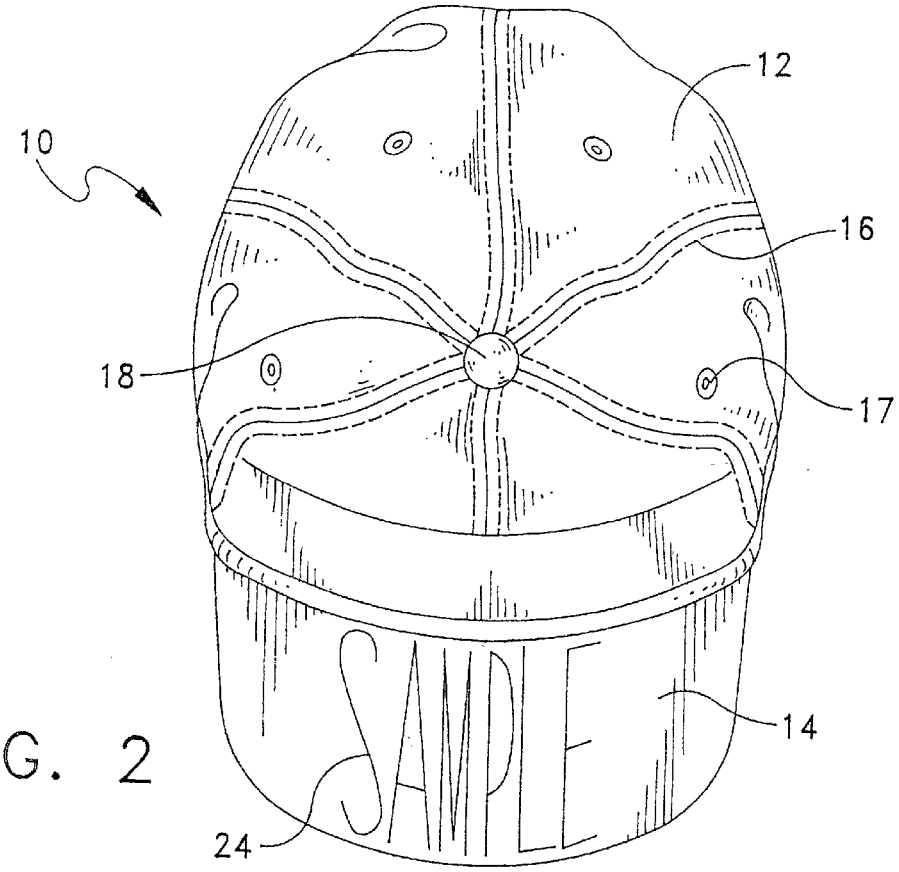
FIG. 2 is a top view thereof.
Figure 3:
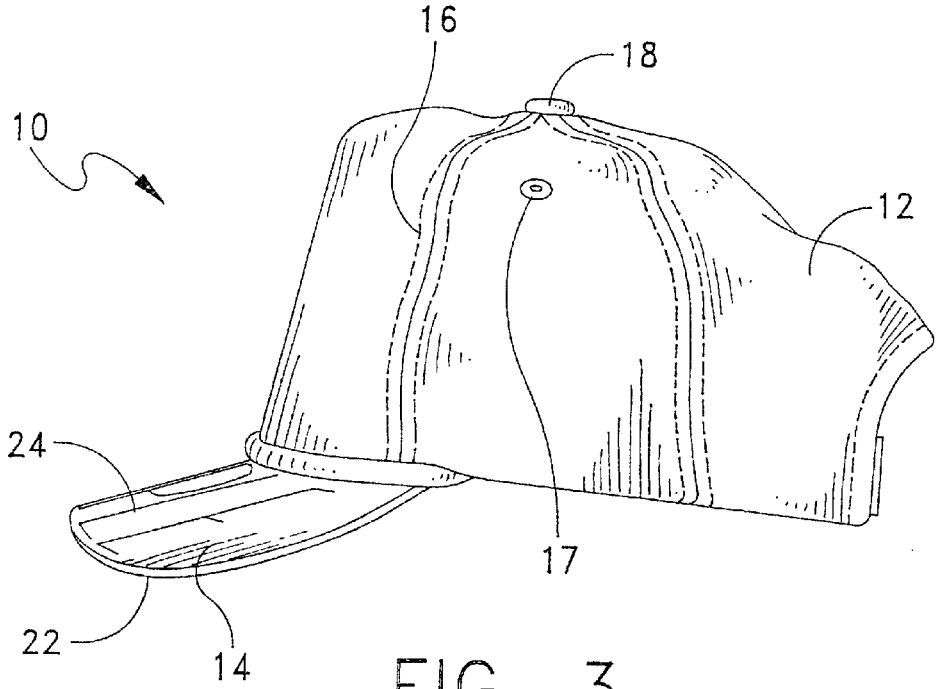
FIG. 3 is a side view thereof.
Figure 4:
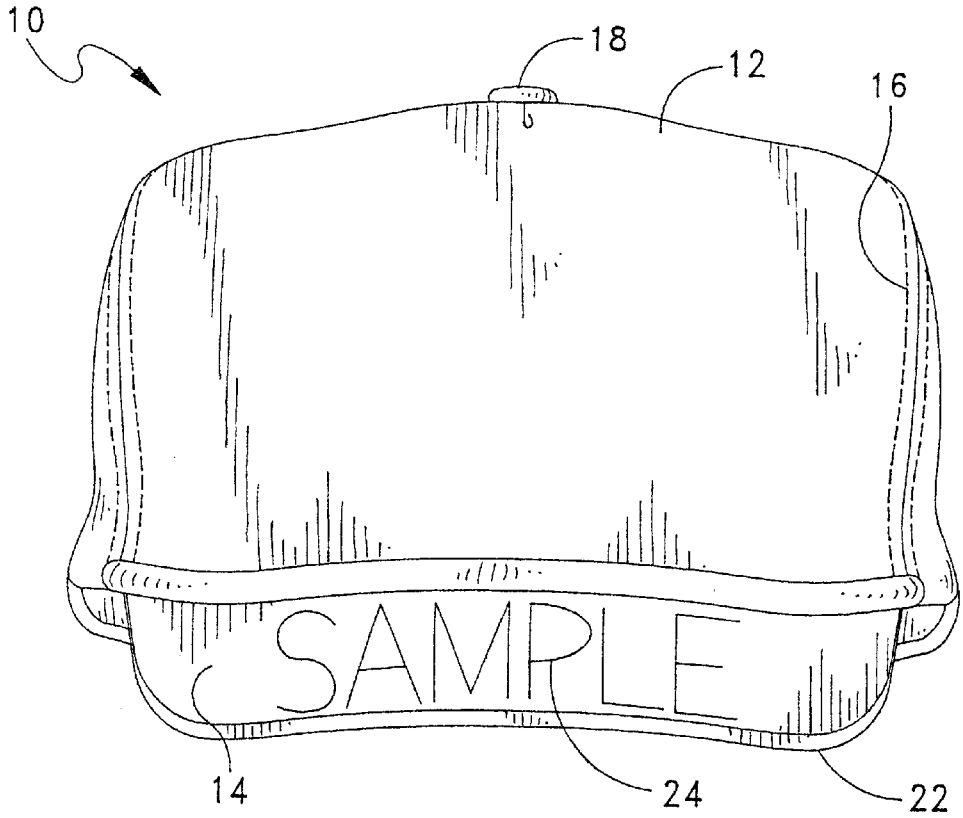
FIG. 4 is a front view thereof.

Referring to FIGS. 2–4, the effect of the distorted text 24 applied to the upwardly facing surface 20 of the visor 14 is more clearly depicted. The text distorted is shown most clearly in FIG. 2 in which the text 24 is shown viewed from a ninety degree position above the cap. As illustrated, the text is distorted in such a manner that it is out of proportion and difficult to read when viewed from the ninety degree position. Referring to FIG. 4, the text 24 is shown viewed from a substantially "face-to-face" or frontal position. As illustrated, the text 24 has been distorted in such a manner that it corrects for perspective when viewed from the "face-to-face" position and restores the text to its correct proportions which makes same more easily viewable. Specifically, when one views the visor from a frontal position, the angulation of the visor causes a foreshortening of normally proportioned graphics that make them difficult to read or understand. By calibrating this angulation, it is possible to distort the graphics when they are applied to the visor to compensate for the distortion that one normally sees from the frontal position, so as to make the graphics more easily readable from said frontal position. The novelty in the invention is that when an observer looks at the distorted text 24 on the exposed surface 20 of the visor 14, from a position above the surface 20, it is difficult to understand or read, but when a person puts the hat on his/her head and it is viewed by that same observer from a substantially "face-to-face" position, the effect of the distorted text is such that it corrects for perspective and becomes more easy to read. The distorted text 24 is computer generated in such a manner that when it is applied to the upwardly facing surface 20 of the visor 14 and viewed from a "face-to-face" position, the angle of the visor gives the distorted text 24 the appearance that it is normally proportioned.

Figure 5:
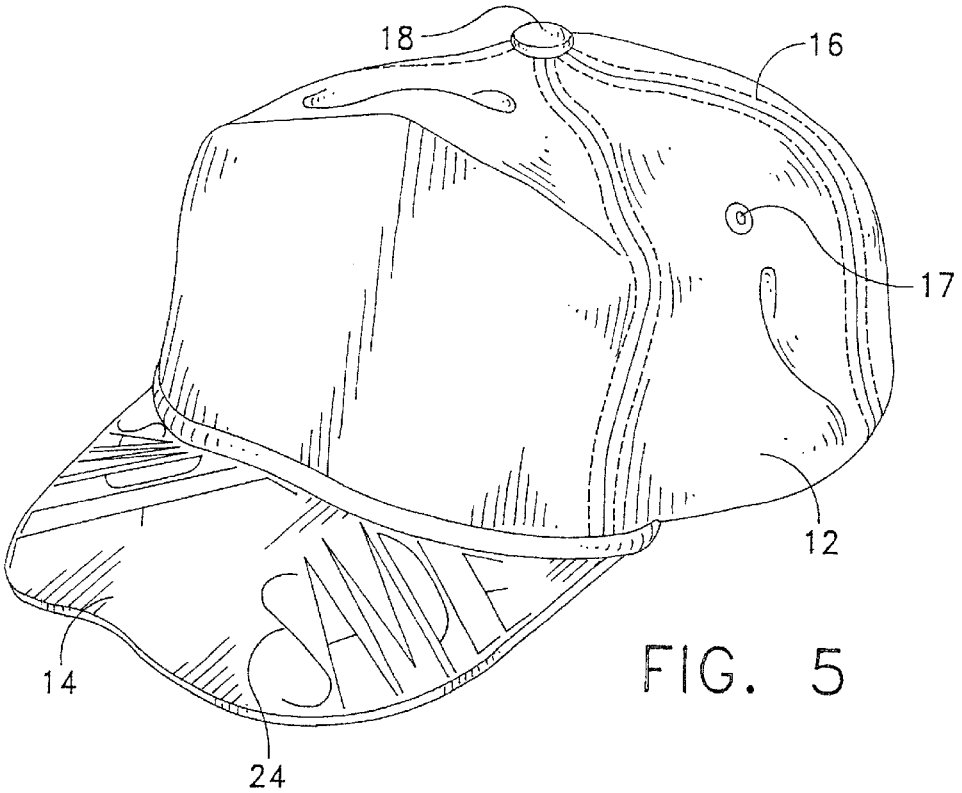
FIG. 5 is a perspective view showing a baseball cap provided with distorted text in a rolled viewing position on the visor of the cap.
Figure 6:
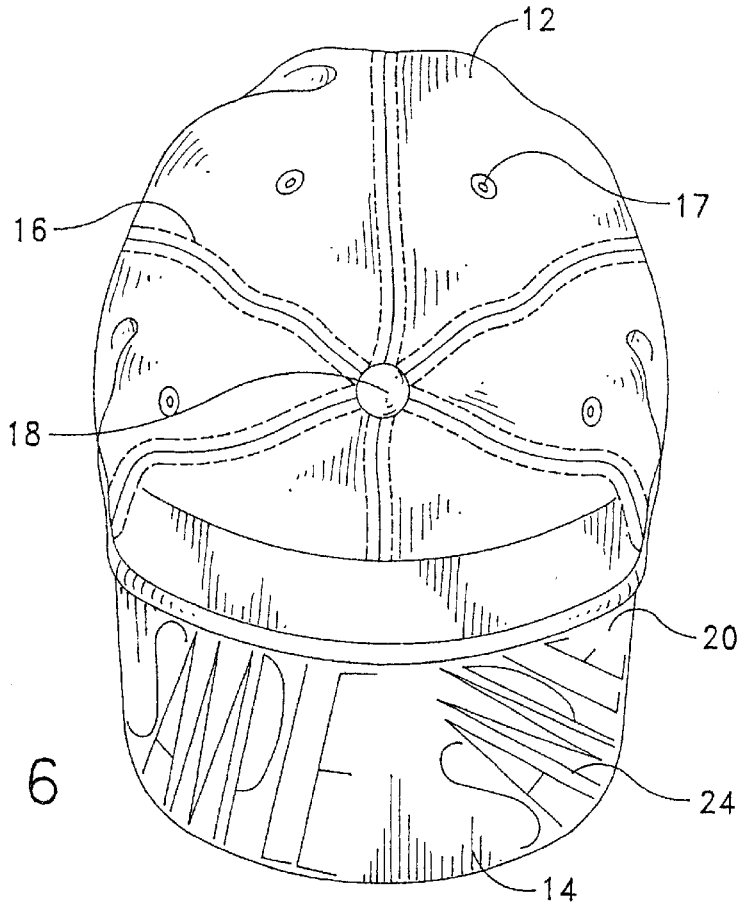
FIG. 6 is a top view thereof.
Figure 7:
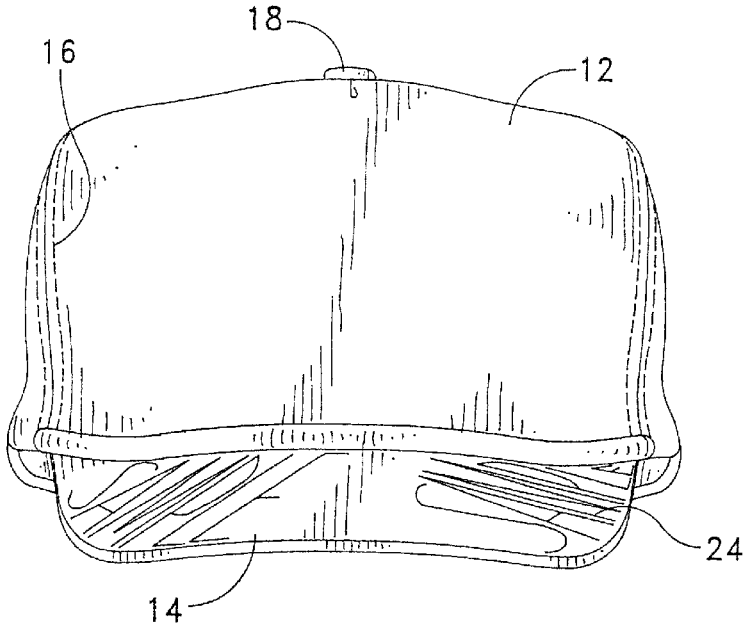
FIG. 7 is a front view thereof.
Figure 8:
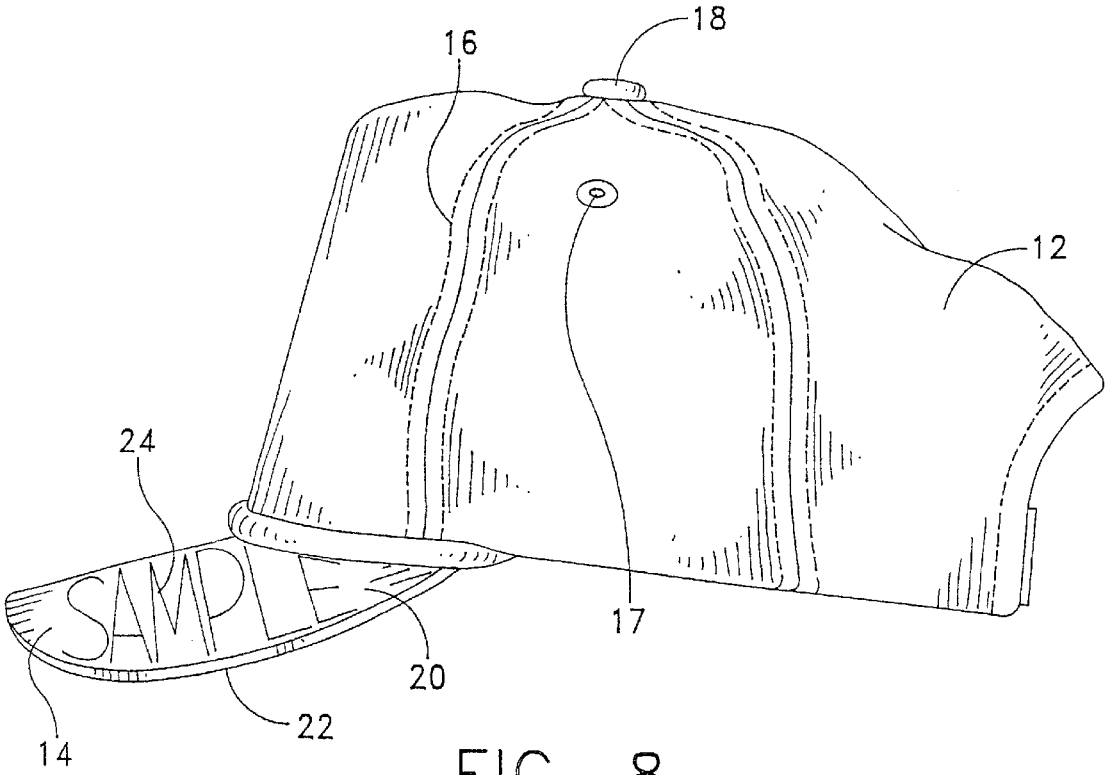
FIG. 8 is a side view thereof.

Referring now to FIGS. 5–8, text 24 is once again applied to the upwardly facing surface 20 of the visor 14, and distorted in such a manner that it corrects for perspective when viewed from a particular position. As shown in the figures, the text 24 is positioned at opposing ends of the visor 14 and corrects for perspective when the visor is in the "rolled visor" position. The text 24 is distorted in this embodiment to correct for perspective when the visor 14 of the cap 10 is sculpted. In order to make a baseball cap more comfortable and better looking, it is often times desirable to "sculpt" the cap. The process of sculpting entails curving or bending the edges of the visor 14 so that the hat has a more "broken in" look. FIGS. 5–8 illustrate text 24 which is distorted in such a manner to correct for perspective, when applied to the visor of a hat having the "rolled visor" effect, when viewed from a particular position, i.e., the "face-to-face" position. As shown in FIGS. 5–7, the distorted text 24 is difficult to read when viewed from above the visor as depicted in FIG. 6. However, when the visor 14 of the cap 10 is sculpted, or in the "rolled visor" position, and viewed from a particular viewing position, the distorted text compensates for the visual "face-to-face" distortion so as to be easy to read, note FIG. 8. As discussed above, the novelty of the invention resides in the fact that the distorted graphics 24 have an illusionary type effect when applied to the upwardly facing surface 20 of the visor 14. The distorted graphics are difficult to read when viewed from a position above the visor, but when the visor is viewed straight on, the angle of the visor and the positioning of the observer make the graphics more legible and easier to read. It should be understood that the graphics are distorted to different extents, in order to correct for perspective and restore correct proportions, depending on the particular viewing position and shape or design of the visor.

Figure 9:
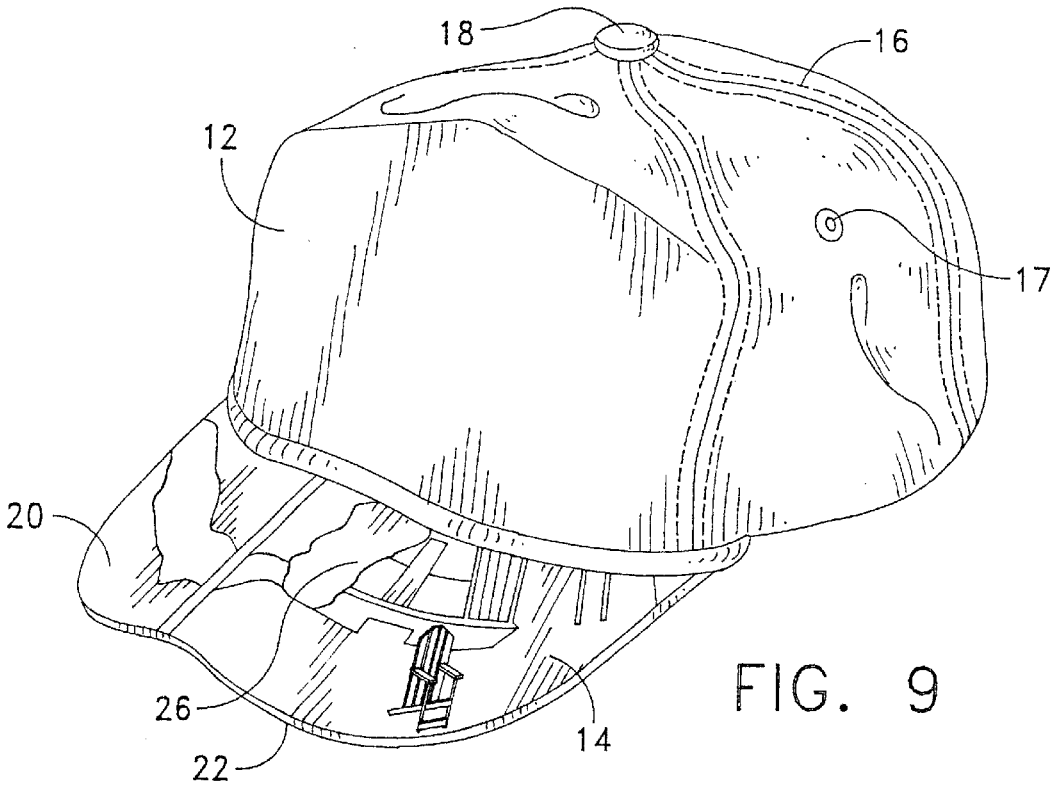
FIG. 9 is a perspective view showing a baseball cap provided with distorted graphics on the visor of the cap.
Figure 10:
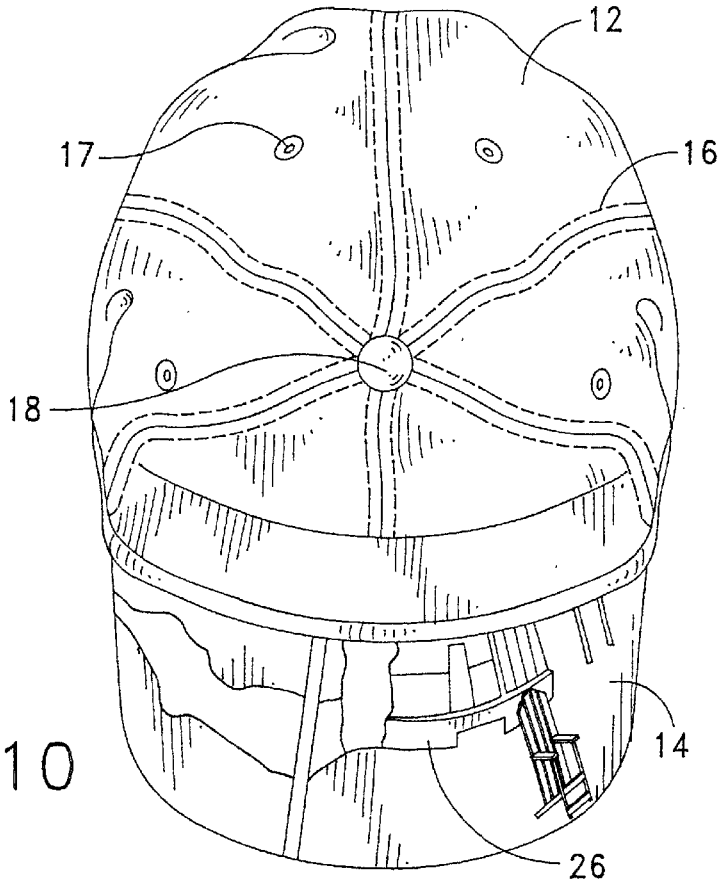
FIG. 10 is a top view thereof.
Figure 11:
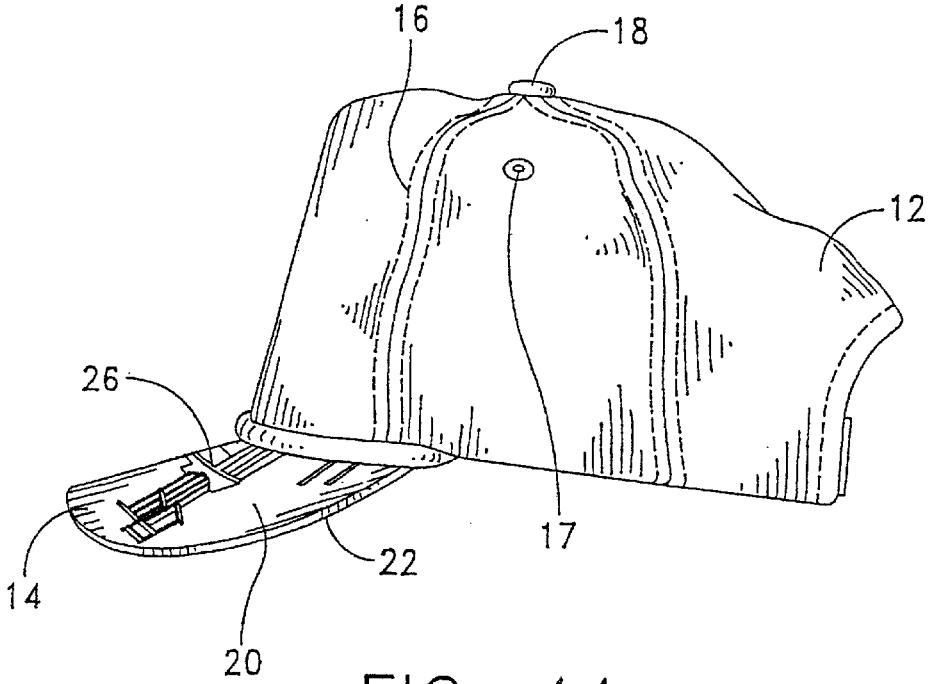
FIG. 11 is a side view thereof.
Figure 12:
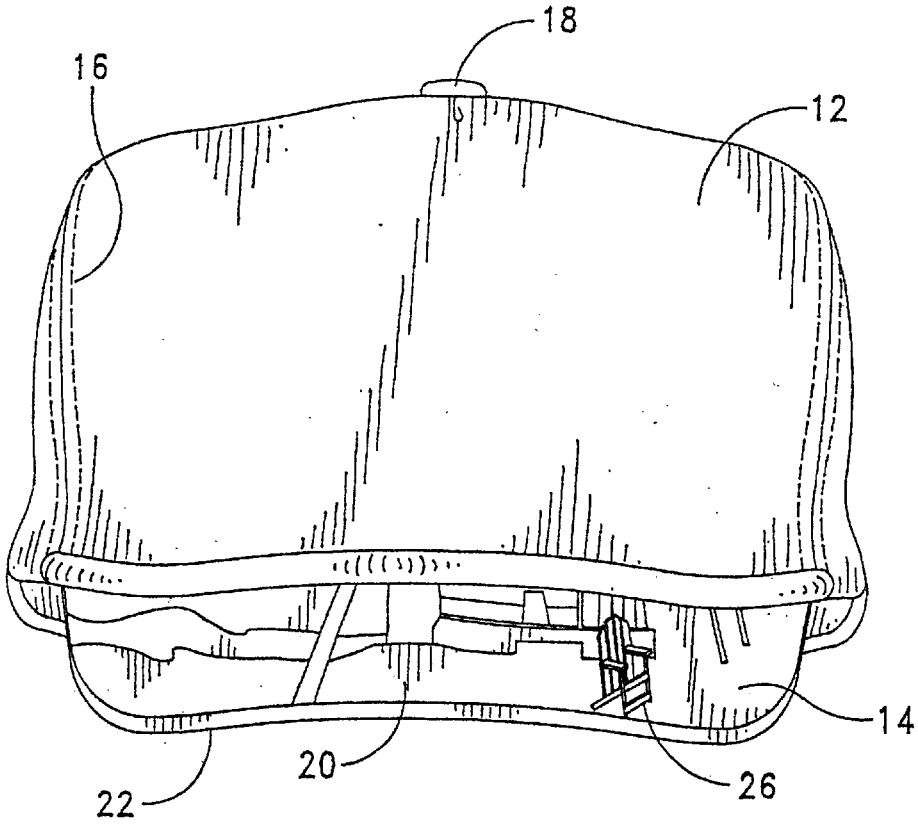
FIG. 12 is a front view thereof.

Referring now to FIGS. 9–11, graphics in the form of a pictorial 26 are shown applied to the upwardly facing surface 20 of the visor 14. The pictorial graphics 26 are distorted in the same manner as the text graphics 24 so that when applied to the upwardly facing surface 20 of the visor 14 and viewed from a particular viewing position, the effect of the distortion is to correct for perspective to enable the graphic pictorial 26 to be more clearly viewable. As shown in FIGS. 9–11, the graphical pictorial shows a panoramic view of mountains, a lake, and a cabin. As shown in FIG. 10, the pictorial graphic is distorted in such a manner that when viewed from above the visor, it is difficult to view, and out of proportion. However, when viewed from a "face-to-face" position, as shown in FIG. 12, the angle of the visor 14, and the effect of the distortion, result in the pictorial 26 being correctly proportioned so that it can be more easily and correctly viewed.

It can therefore be seen that the instant invention provides for a novel display of distorted graphics applied to the upwardly facing surface of a baseball cap visor. The graphics may include text graphics or pictorial graphics and be distorted in such a manner that the graphics are out of proportion when viewed from above, but are correctly proportioned when viewed by an observer in a confronting "face-to-face" position. The distorted graphics may be directly printed onto the visor of the cap or heat transferred thereon from a heat transfer sheet. Any number of differently selected text or pictorial graphics may be appropriately distorted and applied to the visor of the cap creating a wide variety of different hats to choose from. The distorted text applied to the visor of the hat provides a unique product which captures the attention of both the wearer and an observer. The graphics may include a variety of text or pictorials having endless advertising possibilities. For these reasons, the instant invention is believed to represent a significant advancement in the art which has substantial commercial merit.

Although the invention has been described and illustrated as applied to a visor of a baseball cap or the like, it will be apparent that it is applicable to graphics applied to any surface that is in angular disposition to the line of sight of a viewer, whereby the graphics are distorted when so viewed. For example, graphics on an awning will appear distorted when viewed by one standing in front of the awning due to the angular disposition of the awning. However, as previously described, this distortion can be compensated for by applying distorted graphics to the awning so proportioned as to make the graphics easily readable when viewed from the front.

While there is shown and described herein certain specific structure embodying the invention, it will be manifest to those skilled in the art that various modifications and rearrangements of the parts may be made without departing from the spirit and scope of the underlying inventive concept, and that the same is not limited to the particular forms herein shown and described except insofar as indicated by the scope of the appended claims.

What is claimed is:

1. A visor for protecting a wearer's eyes from the sun or the like, said visor having upwardly and downwardly facing surfaces;

means for retaining said visor on the head of a wearer;

distorted graphics applied to the upwardly facing surface of said visor, the distortion of said graphics being such as to compensate for the distortion that normally exists when non-distorted graphics are applied to the top surface of a visor and the visor is viewed by someone in "face-to-face" relation with a wearer of the visor;

said retaining means comprising a baseball cap.

2. A visor as set forth in claim 1, wherein said distorted graphics are computer generated.

3. A visor as set forth in claim 1, wherein said distorted graphics are text.

4. A visor as set forth in claim 1, wherein said distorted graphics are pictorial.

5. A method for making graphics on a slanted surface of an eye visor more easily readable when viewing the surface from a frontal position, comprising the following steps:

a.) providing an eye visor having a slanted surface;

b.) determining the perspective angle change of the surface between said frontal viewing position, and a 90° viewing position where the line of sight is perpendicular to the surface;

c.) distorting normally proportioned graphics so that perspective foreshortening that occurs when the surface is viewed from said frontal position is compensated for so as to make said graphics more easily readable; and d.) providing a means for applying said distorted graphics to said surface.

6. The method of claim 5, further including the step of providing the visor as a part of a baseball cap.

*7. A visor for protecting a wearer's eyes from the sun or the like, said visor having upwardly and downwardly facing surfaces;*

*means for retaining said visor on the head of a wearer;*

*distorted graphics applied to the upwardly facing surface of said visor, the distortion of said graphics being such as to compensate for the distortion that normally exists when non-distorted graphics are applied to the top surface of a visor and the visor is viewed by someone in "face-to-face" relation with a wearer of the visor.*

*8. The visor of claim 7, wherein said distorted graphics are computer generated.*

*9. The visor of claim 7, wherein said distorted graphics are text.*

*10. The visor of claim 7, wherein said distorted graphics are pictorial.*

*11. An awning having an upwardly facing surface, the awning comprising:*

*distorted graphics applied to the upwardly facing surface of the awning, the distortion of said graphics being such as to compensate for the distortion that normally exists when non-distorted graphics are applied to the top surface of an awning and the awning is viewed by someone in "face-to-face" relation with the front of the awning.*

*12. The visor of claim 11, wherein said distorted graphics are computer generated.*

*13. The visor of claim 11, wherein said distorted graphics are text.*

*14. The visor of claim 11, wherein said distorted graphics are pictorial.*

* * * * *